Figure 1:
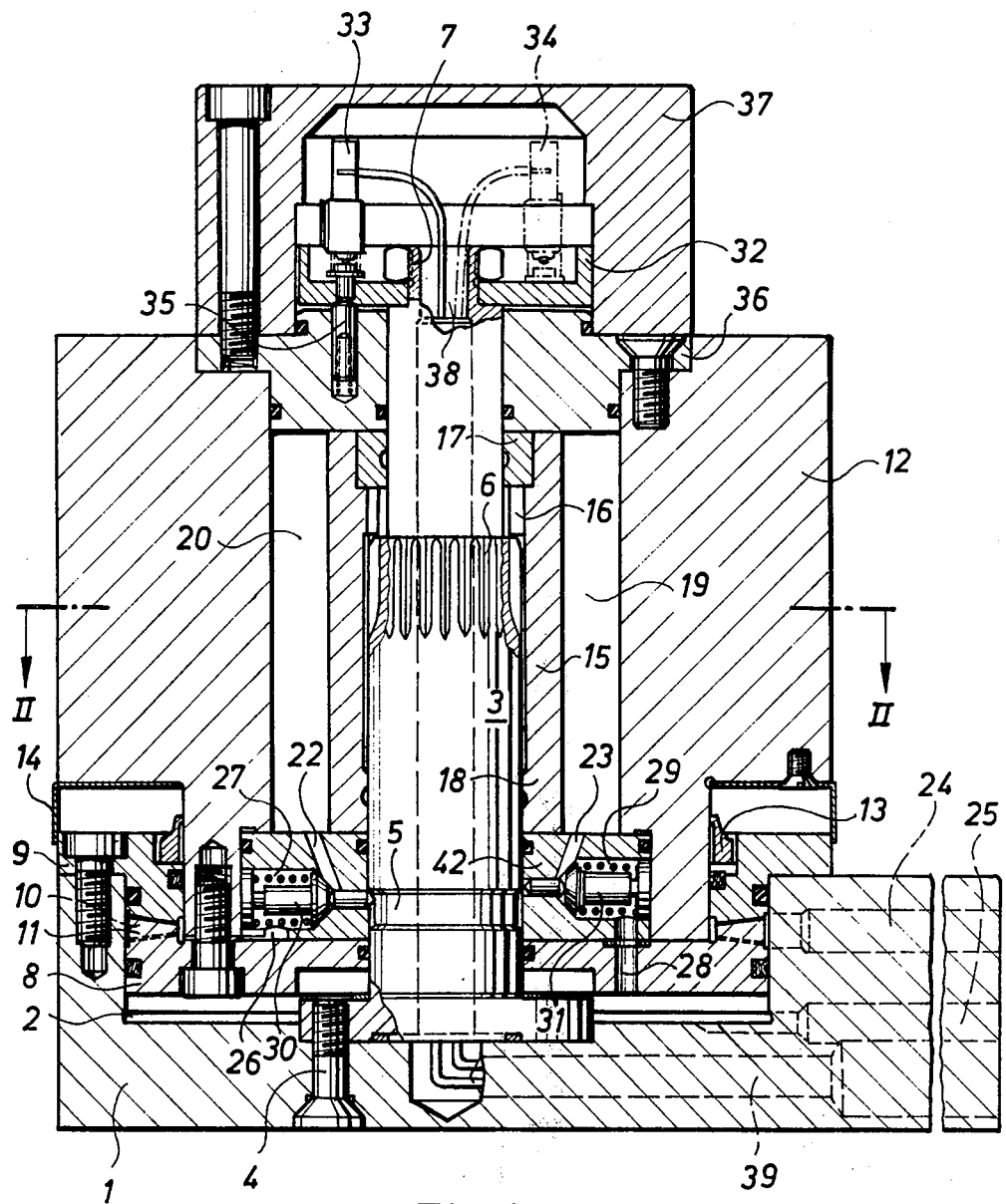

United States Patent [19]

Thumm et al.

[11] 3,905,257

[45] Sept. 16, 1975

[54] TOOL ROTATING DEVICE

[75] Inventors: Helmut Thumm; Hans Kettel, both of Metzingen, Germany

[73] Assignee: Willy Sauter KG, Germany

[22] Filed: Sept. 10, 1974

[21] Appl. No.: 504,841

[30] Foreign Application Priority Data

Sept. 15, 1973 Germany............................ 2346626

[52] U.S. Cl...................... 82/36 A; 74/822; 74/826
[51] Int. Cl.[2]..................... B23B 29/24; B23B 29/32
[58] Field of Search........... 82/36 A; 74/813 L, 822, 74/826

[56] References Cited
UNITED STATES PATENTS

| | | | |
|---|---|---|---|
| 2,915,922 | 12/1959 | Treer................................. | 82/36 A |
| 3,162,064 | 12/1964 | Musy................................. | 82/36 A |
| 3,545,317 | 12/1970 | Shultz et al....................... | 82/36 A |

*Primary Examiner*—Leonidas Vlachos
*Attorney, Agent, or Firm*—Roylance, Abrams, Berdo & Kaul

[57] ABSTRACT

A tool rotating device includes tool means mounted on a holding body which surrounds a cylindrical member rotatably and slidably disposed upon a fixed central pivot member. A pair of arcuate pistons are disposed in the annular space between the holding body and the cylindrical member, with one piston being attached to the holding member and the other piston being attached to the cylindrical member. The pistons, cylindrical member and holding member are all shiftable axially relative to the central pivot member by fluid pressure means delivered through a flow circuit. The flow circuit also delivers fluid pressure to the annular space to rotate said one piston and said holding body and hence to rotate said tool means.

8 Claims, 2 Drawing Figures

TOOL ROTATING DEVICE

This invention relates to means for moving cutting tools and more particularly it relates to a device for rotating cutting tools through a preselected rotational movement, which, according to the preferred embodiment of invention described herein, is 180°.

The present invention provides a simple and stable construction which through a combination of mechanical inter-engagement and fluid pressure creates a positive and effective rotation of tools, such as cutting tools. While in the embodiment to be described hereinafter, the rotation is through 180°, the principles of the present invention permit a rotational angle during each operation amounting to 360°/n, where $n$ is a whole number such as 2, 3 or the like. Because of the unique construction of the apparatus of the present invention, the results can be accomplished using a device which takes up a minimum amount of space, but which operates in an efficient and effective manner.

Figure 2:
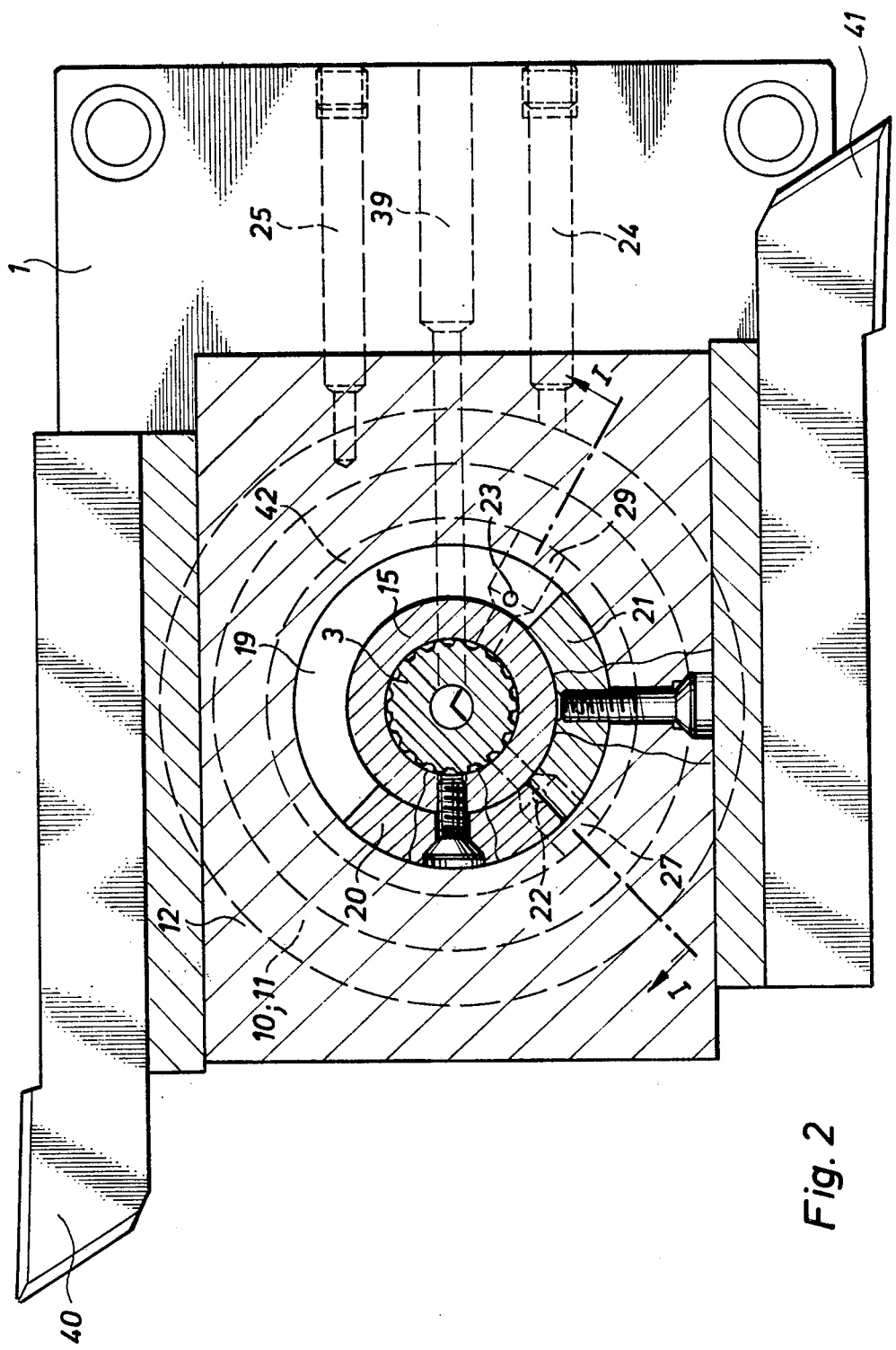

Referring now to the drawings, which form a part of this original disclosure and which show a preferred embodiment of the present invention:

FIG. 1 is a sectional view of the apparatus of the present invention taken along line I—I of FIG. 2; and FIG. 2 is a transverse sectional view taken generally along the line II—II of FIG. 1.

Referring now to the drawings, there is shown in FIG. 1 a base member 1 which can be suitably attached to the cross member of a lathe or on the movable carriage of any other suitable type of machine, not illustrated. The base member 1 has a cylindrically shaped recess 2 formed therein. An upstanding central pivot member 3 is carried by the base member and is fixedly attached thereto by means of a screw 4.

The central pivot member 3 is provided with an annular groove 5 along the lower portion thereof, which groove has angularly extending shoulders at the top and bottom thereof. The groove and the shoulders themselves serve to operate valve members in a manner which will be described hereinafter. The intermediate portion of the central pivot member 3 is provided with a series of external teeth 6, as can better be seen in FIG. 2. From the intermediate portion, the pivot member continues, with a slightly reduced diameter, terminating in a narrow threaded end portion 7 onto which a nut can be threaded, as illustrated in FIG. 1.

Disposed within the recess 2 of the base member is a movable cylindrical member 8, which acts as a lifting member. The lowermost position of the movable member 8 is that when it engages against the bottom of the recess 2. The uppermost position is that when it engages against a stop member 9 which is attached by bolts to the base member 1 which includes a portion projecting into the recess. The projecting portion of the stop member is provided with gear teeth 10 and corresponding gear teeth 11 are provided on the movable member 8 so that when the movable member is in the raised position shown in FIG. 1, the teeth 10 and 11 are in engagement with one another.

For purposes of describing the apparatus, the term axial can be considered as extending along the central axis of the device which is the axis of the central pivot member 3. As such, the teeth 6 can be considered as extending axially while the gear teeth 10 and 11 can be considered as extending radially.

A holding body 12 surrounds the central pivot member 3 and serves to mount a pair of tool members 40, 41, as shown in FIG. 2. The movable member 8 is attached to the holding body 12 by bolt means as illustrated in FIG. 1. A scraper 13 is carried by the stop member 9 to scrape along the reduced diameter lower portion of the holding body 12. A sleeve 14 is attached to the holding body and provides a depending skirt for slidable movement along the outside of the stop member 9 and possibly also the outer portion of the base member 1.

A cylindrical member 15 surrounds the pivot member 3. The cylindrical member 15 has an inner set of axially extending teeth 16 which are adapted to mesh and engage with the teeth 6 on the pivot member. The number of teeth in the axial set of teeth 6 and 16 can be equal to the number of radial teeth 9 and 10, but if the number is unequal, then the radial teeth constitute an integral multiple of the number of axial teeth. In the position shown in FIG. 1 the axial teeth 6 and 16 are not in engagement with one another. Slidable movement of the cylindrical member 15 with respect to the fixed pivot member 3 is guided at the upper end by a guide collar 17, which is a separate member and at the lower end by a guide sleeve portion 18 which is integral with the cylindrical body 15. The guide sleeve 17 is provided with some type of vent or bore to permit air to escape from the small space between the exterior of the pivot member 3 and the interior of the cylindrical member 15.

An annular space 19, which can also be called a motor chamber, is provided between the exterior of the cylindrical member 15 and the interior of the cylindrical bore of the holding body 12. Within this annular space, a pair of sectional arcuate pistons 20 and 21 are provided. As illustrated in FIG. 2, the piston 20 is attached by a bolt to the cylindrical member 15 while the piston 21 is attached by a bolt to the holding body 12. The holding body 12, the cylindrical member 15 and the pistons 20, 21, constitute the adjusting motor in the present invention. As shown in FIG. 2, the pistons 20 and 21 are each arcuate sectional pistons developed about an angle of 90°. Hence, when the two pistons are in contact, as illustrated in FIG. 2, they take up 180° of space in the annular chamber 19, leaving the other 180° of space open for movement. Thus, if one piston member is held stationary and the other piston member is rotated, the rotating piston member can move through a rotational movement of 180° before it comes into contact with the fixed piston.

An intermediate body 42 is positioned between the cylindrical member 15, the holding body 12 and the movable member 8, as illustrated in FIG. 1. Within this intermediate body 42, a pair of valve chambers 27 and 29 are provided within which a pair of radially movable valves 30 and 31, respectively, are mounted. Biasing springs urge these valves to a closed position where a pin at the inner end of the valve is engageable against a portion of the central pivot member 3. As illustrated, the valve 30 is spaced slightly axially lower than is the valve 31. As a result, in the embodiment of FIG. 1, the valve 30 is in closed position since the projecting pin at the end thereof fits into the annular groove 5 on the pivot member 3. On the other hand, the pin on the valve 31, being higher than the annular groove, engages against the outer wall of the pivot member 3 and hence the valve 31 is in an open position.

A flow passage 22, 26 through the intermediate member 42 is controlled by the valve 30. When this valve is closed, flow through these passages is also closed, and the flow passage 22 communicates with the annular chamber 19. The flow passage 23 operates in a similar manner and is controlled by the valve 31, but additionally, communicates with a channel or flow passage 28 in the movable member 8.

A switch support member 32 is attached to the threaded end 7 of the pivot member 3 by means of a nut as illustrated in FIG. 1. The switch support member 32 carries a pair of electric switches 33, 34, the control wires for which extend through a central bore 38 in the pivot member 3 and exit through a bore 39 in the base member. The switches are operated by means of an operating peg 35 which is carried in a closing body 36 attached by bolts to the outer end of the holding body 12. A hood 37 covers the switches and is attached by bolts to the closing body 36, thereby closing the upper end of the device.

Although it is not illustrated, a source of fluid pressure is provided, as is a master control valve for directing the fluid pressure. A pair of bores or ports 24, 25 are formed in the base member 1 and are connectable with the fluid pressure supply and the collecting tank. In other words, if pressure is delivered through the port 24, then the port 25 is connected to the tank, and vice versa. The switches 33, 34 control operation of the master control valve.

For purposes of describing operation of the device, let it be assumed that the fluid pressure circuit delivers fluid under pressure through the bore 24. When such fluid pressure is delivered, it enters between the stop member 9 which is fixed and the movable cylindrical member 8 which is movable. As a result, the member 8 is moved downwardly in the recess 2, thereby disengaging the radial gear teeth 10 and 11. On the other hand, such downward movement also causes downward movement of the adjusting motor, that is, the holding body 12, the cylindrical member 15, and the pistons 20 and 21. Such downward movement engages the axial teeth 16 on the cylinder with the axial teeth 6 on the pivot member 3. Such axial movement also causes the valve 30 to open as it moves downwardly past the annular groove 5 on the pivot member and it likewise causes the valve 31 to close as it comes into alignment with the annular groove 5. The pressure travelling through the bore 24 thus passes through the flow passage 26, the valve chamber 27, the flow passage 22 and enters the annular flow passage 19 between the rotary pistons 20 and 21, as illustrated in FIG. 2. When this occurs, the rotary piston 21 is rotated through 180° until it contacts against the opposite side surface of the piston 20. Since the piston 21 rotates, the movable member 8, the holding body 12, the closing body 36 and the tools 40 and 41 are likewise rotated through 180°. As the closing body 36 is so rotated, the operating peg 35 carried therein engages against the switch 34 and sets the same into operation. This reverses the master control valve so that the high pressure fluid is then delivered through the port 25, while the port 24 is connected with the tank.

As the pressure is delivered through the port 25, it flows into the recess 2, thereby lifting the movable member 8 upwardly in the recess until the teeth 11 thereon again engage with the teeth 10 on the stop member 9. This lifting of the movable member 8 is accompanied by a lifting of the intermediate member 42, the holding body 12 and the cylindrical member 15, and as a result, the axial teeth 16 are moved out of engagement with the teeth 6 on the pivot member. As a result of this lifting motion, the valve 30 under the control of the annular groove 5 is closed while the valve 31 which moves upwardly past this annular groove is opened. The pressure being delivered to the port 25 thus flows through the recess 2, through the flow passage 28, the valve chamber 29 and the flow passage 23 and enters the annular chamber 19. As a result, the piston 20 then moves through an angular movement of 180°, thereby rotating the cylindrical member 15 with it. As the piston 20 is displaced and returns to its original position, the parts are restored to operate for another cycle.

It can thus be understood that the base member 1, the pivot member 3 and the stop member 9 all remain fixed in position while the other parts, notably, the movable member 8, the intermediate body 42, the holding body 12, the cylindrical member 15 and the pistons 20 and 21 are all movable.

Various changes apparent to those skilled in the art may be made without departing from the spirit and scope of the invention as defined in the appended claims.

What is claimed is:

1. A tool rotating device comprising:
 a fixed central pivot member;
 a holding body concentrically surrounding said fixed central pivot member and spaced therefrom to define an annular chamber;
 tool means attached to said holding body;
 rotary piston means disposed in said annular chamber; said rotary piston means including a pair of arcuate pistons;
 a cylindrical member disposed in said annular chamber between said pistons and central pivot member;
 one of said pistons being fixed to said cylindrical member and the other of said pistons being fixed to said holding body;
 means for shifting said pistons, holding body and cylindrical member axially with respect to said central pivot member;
 said cylindrical member having internal gear teeth and said central pivot member having external gear teeth, said internal and external teeth being engaged when said cylindrical member is shifted axially in one direction with respect to said central pivot member and being disengaged when said cylindrical member is shifted axially opposite to said one direction;
 said means for shifting comprising fluid pressure means including a flow circuit by which fluid under pressure is delivered to said annular chamber to rotate said piston fixed to said holding member, and to thus rotate said holding member and said tool means attached thereto.

2. A tool rotating device as defined in claim 1 further including a base member to which said central pivot member is attached, a stop member carried by said base member and defining a recess in said base member, and a movable member disposed in said recess and coupled with said holding body for movement therewith.

3. A tool rotating device as defined in claim 2 wherein said stop member has a toothed portion and wherein said movable member has a toothed portion, said toothed portions being out of engagement when said cylindrical member is shifted in said one direction and being in engagement when said cylindrical member is shifted in said opposite direction.

4. A tool rotating device as defined in claim 3 wherein the number of teeth on said toothed portions is an integral multiple of the number of said internal and external teeth.

5. A tool rotating device as defined in claim 3 further includes an intermediate member between said movable member and said cylindrical member, a pair of valves carried by said intermediate member, said valves being spaced apart from one another axially of said central pivot member and being engageable with a valve operating portion along said central pivot member.

6. A tool rotating device as defined in claim 5 wherein said flow circuit includes flow passages through said intermediate member to communicate with said annular chamber, said pair of valves being positioned to control flow through said flow passages.

7. A tool rotating device as defined in claim 6 wherein one of said valves is opened to permit flow through its associated flow passage by said axial shifting in said one direction and the other of said valves is opened to permit flow through its associated flow passage by axial shifting in said opposite direction.

8. A tool rotating device as defined in claim 1 further including switch means connected in said flow circuit, said switch means being operated by rotation of said piston.

* * * * *